Sept. 18, 1973 G. MANGUS 3,759,766

METHOD FOR PRECISION MODIFICATION OF PRELIMINARILY-ETCHED PHOTO-ENGRAVED COLOR PLATES

Filed Sept. 28, 1971

INVENTOR
GEORGE MANGUS

BY Barthel & Bugbee
ATTORNEYS

United States Patent Office
3,759,766
Patented Sept. 18, 1973

3,759,766

METHOD FOR PRECISION MODIFICATION OF PRELIMINARILY-ETCHED PHOTO-ENGRAVED COLOR PLATES

George Mangus, Miami, Fla., assignor to The Miami-Herald Publishing Company, Miami, Fla.

Filed Sept. 28, 1971, Ser. No. 184,549
Int. Cl. B41c *1/00;* B41m *3/02*
U.S. Cl. 156—14 1 Claim

ABSTRACT OF THE DISCLOSURE

A photo-engraved color plate, which has been preliminarily etched to a depth slightly less than the required final depth and with the hard first resist remaining on the raised portions of the plate, is rubbed with a dry filler powder such as powdered magnesium carbonate to fill the depressions in the plate. Powder is then removed from depressions adjacent the raised lines or areas of the portions of the plate to be left unchanged by applying to such depressions the non-abrasive tip of the nozzle of a hand-held "vacuum pencil" connected to a vacuum pump by means of a flexible tube. This filler powder is not removed from depressions adjacent lines or areas of a given color plate where there is an excess of the color contributed from that plate which would cause spurious tones to be otherwise printed therefrom. A special degradable soft resin second resist is then sprayed over the entire plate, including the raised areas still covered with the hard first resist remaining after the first or preliminary etch. In the depressed portions from which the vacuum pencil has completely removed the filler powder, the second resist prevents subsequent re-etching thereof by protecting the side walls of the depressions from any further attack by the etching acid. In each depression containing the filler powder, such powder forms a plug, the top portion of which combines with the second resist to form an acid-penetrable weak crust. The plate is now subjected to the second or fine etch, the acid of which penetrates this crust to enter each depression containing such a filler powder plug. Each plug then acts to neutralize the etching acid adjacent thereto but permits the etching acid outside the plug to react most strongly against the metal of the plate forming the side and bottom walls of the depression, eating away the side wall to reduce the top areas of the raised portions or dots without undercutting these top areas. This action reduces the effect which the particular color plate will have on the color printed from that plate, hence modifies otherwise spurious tones to produce true tones in printing. Following the second or fine etch, the second or soft resist is removed by washing it out with acohol without disturbing the first or hard resist. The filler powder plugs and hard resist coating are then removed by a brushing action with a stiff-bristled brush.

BACKGROUND OF THE INVENTION

The present invention relates to the photo-engraving of color plates, and provides an improved method and means of masking and re-etching such plates with much greater precision and finer detail and gradation of tones than has previously been achieved. In newspaper color printing two or more plates are etched, each representing a different color as desired. High speed mechanical photo-engraving employs three filters, namely red, green, and blue filters to transmit the color image for each plate. The prior process although speedy produces spurious tones in each printed image.

Hitherto, as set forth in the Gunterman Patent 1,592,265 of July 13, 1926, for "Process of Making Engravings," the half-tone screen is subjected to a preliminary etch. The thus-etched surface of the plate is now rubbed with magnesia powder to fill the etched depressions therein, and is then coated with an etching-acid-resisting film of rosin and shellac dissolved in alcohol. The magnesia in the depressions of the plate combines with the resist coating thereover to weaken it. The operator by rubbing with a stiff bristle brush now removes both the film and the magnesia from the portions of the plate which he wishes to modify, without disturbing the film over the raised portions thereof which he does not wish to disturb. The thus modified plate is then re-etched to the desired extent, whereupon the protecting film and the underlying magnesia remaining upon it are removed by applying a suitable solvent solution to the plate to dissolve the film, the plate is then brushed to remove the remaining film and remaining magnesia, after which it is washed and dried. The Gunterman process requires considerable time and skill for carrying it out, and lacks sufficient precision to produce delicate shading and high lights more nearly simulating the natural colors of the objects photographed in making the plates. Another prior procedure of blowing the powder out of the depressions also lacks precision and loses detail in the plate. The method and apparatus of the present inventon achieve great precision by enabling the modification of fine details, and do so with greater rapidity, yet with much less technical skill required by the operator.

Figures 1, 2:
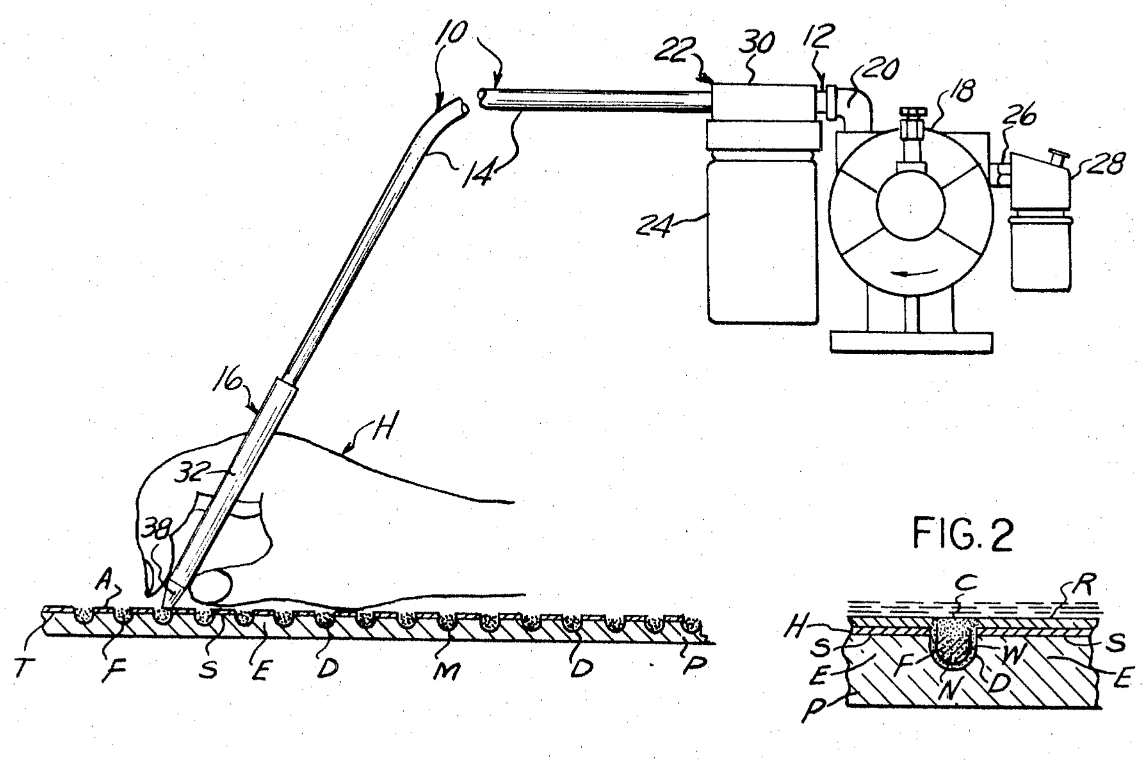
FIG. 1 is a somewhat diagrammatic view of the apparatus employed in carrying out the method of the present invention, with the suction-producing machinery shown on a reduced scale and with the vacuum pencil removing the filler powder from one of the etched depressions in the plate before retching.
FIG. 2 shows a fragmentary portion of the plate of FIG. 1 during re-etching, with one of the depressions therein shown filled with powder and with it and the plate covered with an additional etching-acid-resisting film forming with the powder an acid-penetrable crust over the depression.
Figure 3:
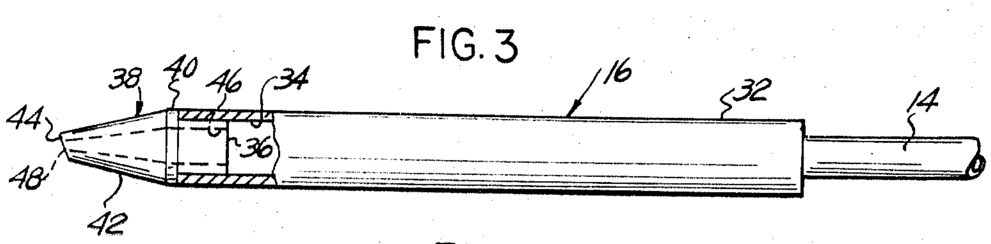
FIG. 3 is a side elevation, partly broken-away, of the vacuum pencil of FIG. 1 with a first type of treatment nozzle attached thereto.

Referring to the drawing in detail. FIG. 1 shows a photo-engraved half-tone plate modifying apparatus, generally designated 10, according to one form of the invention as consisting of a suction-producing unit, generally designated 12, connected by a flexible conduit or tube 14 to a vacuum pencil or suction applicator, generally designated 16, held between the fingers of the hand H of the operator. The suction-producing unit 12 consists of a conventional motor-driven vacuum pump 18 equipped with an air inlet or suction conduit 20 provided with a ten micron intake filter 22 with a powder receptable 24 for removing, from the air being drawn in by the pump 18 through the inlet conduit 20, the particles of powder employed in the method of the present invention. The vacuum pump 18 is also provided with a discharge conduit 26 and discharge filter 28 connected thereto. The rearward end of the flexible conduit 14 is connected to the outer side of the cap 30 of the filter 22 whereas its forward end is attached to the upper end of the handle or barrel 32 of the vacuum pencil or suction applicator 16. The latter is of tubular form with a bore 34 therein (FIG. 3).

Mounted in the forward end of the bore 34 of the barrel 38 (FIG. 3) is the stem 36 of a nozzle 38 of non-abrasive material such as polyethylene plastic. The stem 36 terminates at an annular shoulder 40 from which a tapered substantially conical nose 42 extends downward to the forward end or tip 44 of the nozzle 38. The tip 44 is inclined or angled relatively to the bore 34. Communicating with the bore 34 of the barrel 32 is a bore 46 the forward portion of which is tapered within the forwardly-converging nose portion 42 of the nozzle 38 toward the tip 44 thereof and terminates in an inlet port 48 therein.

Figure 4:
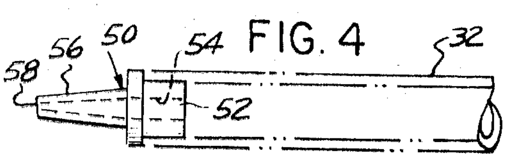
FIGS. 4, 5 and 6 are respectively side elevations of second, third and fourth types of treatment nozzles shown in solid lines, with the adjacent portion of the pencil shown in chain lines.
Figure 5:
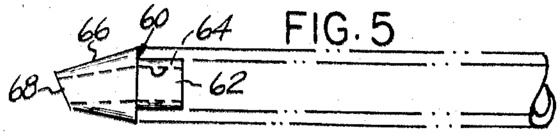
Figure 6:
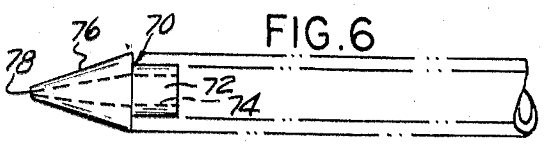

The second nozzle 50, shown in FIG. 4 and interchangeable with the first nozzle 38, is of similar construction to the first nozzle 38 with a similar stem 52 and is similarly bored at 54, except that it has a nose portion 56 of smaller diameter, less sharply tapered, and with a smaller tip 58 thereon disposed perpendicular to the axis of the nozzle 50. The third type nozzle 60 shown in FIG. 5 also is of similar construction to the first nozzle 38 and with a similar stem 62, but is provided with a larger diameter bore 64 leading through a more blunted nose portion 66 and terminating in an angled tip 68. The fourth type nozzle 70 shown in FIG. 6 is likewise provided with a similar stem 72 but with a smaller diameter bore 74 in a more sharply tapered nose portion 76 leading to a perpendicular tip 78. These nozzles of the present invention have been made and used successfully in sizes of bores in their tips ranging in diameters from 0.009 inch to 0.500 inch fitted to a tube of one-half inch inside diameter.

In the method of the invention carried out with the aid of the apparatus 10, let it be assumed that a half-tone plate P, such as a color plate of a set of color plates has been prepared in the conventional manner by photo-engraving so as to be provided with elevations E between depressions D of slightly less than the required final depth resulting from the preliminary or first etching step of the process. The top surfaces S of the elevations E reremain covered with the film or coating H of the first or hard resist. To the plate P thus preliminarily etched, the operator applies a dry powder, such as magnesium carbonate or magnesium oxide, and rubs it over the surface thereof so as to fill up the depressions D with dry filler powder F. The powder F filling the depressions D forms a basic overall powder mask for a further fine etch.

The filler powder F is then removed from the depressions D adjacent the elevations E whose top surfaces S are to remain unchanged in size by applying thereto the tip of the selected nozzle of appropriate size, such as the tip 44 of the nozzle 38 (FIGS. 1 and 3). The suction produced by the vacuum pump 18, which is now placed in operation, produces a corresponding suction in the tube 14 and barrel 32 of the vacuum pencil 16, creating a suction in the nozzle bore 46 at the tip 44 of the nozzle 38. When the tip 44 of the vacuum pencil 16 is placed close to the selected depressions D from which the filler powder F is to be removed to modify the surfaces S by re-etching, the suction draws this powder through the bores 46 and 34 of the vacuum pencil 16 and through the flexible tube 14 into the cap 30 of the powder-removing device 22 where the powder falls into the powder receptable 24 while the filtered air passes onward through the suction conduit 20 into the vacuum pump 18, whence it passes outward through the discharge conduit 26 and discharge filter 28 into the atmosphere.

With the surplus powder thus removed from selected depressions D of the plate P, the operator now applies to the top surface T thereof, including the surface portions S coated wtih the first or hard resist H, a special degradable soft resin coating R composed of orange or clear shellac dissolved in alcohol dyed to a contrasting color such as red by spraying it over the entire surface T of the plate P. Within the depressions D of the surface T from which the operator has previously removed the filler powder F, the resist layer R of resin furnishes an effective and impenetrable barrier to the etching acid subsequently employed in the fine re-etching step of the method. In the depressions D, however, where the filler powder F remains, it forms with the resin layer R a weak, etching-acid-penetrable crust C (FIG. 2).

The plate P is now subjected to the re-etching or finish-etching step. During this stage of the method, the nitric acid employed as the re-etching acid penetrates the crust C and surrounds the magnesium carbonate filler powder plugs N in the filled depressions D. These plugs neutralize the re-etching acid within their interiors while the acid outside and on the bottom of the plug reacts strongly with the unprotected metal forming the side walls W of the elevations E of the plate P composed of zinc or magnesium, and eats away the sidewalls W so as to reduce the areas of the summits S thereof. In this manner, a modification of the top surface T of the plate P is brought about, thereby removing the spurious tones which would otherwise be produced by the plate P without the above-described modifying treatment. After the re-etching has been performed, the plate P is washed, after which the second or soft resist is removed by washing it out with alcohol. The plugs of filler powder F remaining in the depressions D and the portions of the first or hard resist H on the summits S of the elevations E are then rubbed off by means of a stiff bristled brush. The use of the second resist in the depressions from which the powder has been selectively removed by suction coats the side walls of the depressions and prevents undercutting of the summits S of the elevtaions E beneath the first or hard resist layer H. Such undercutting otherwise prevents the paper from parting freely from the plate during printing. During the re-etching step of the method the filler powder plugs F concentrate the re-etching acid of the spaces immediately adjacent the side walls of the depressions D, the acid works most rapidly and effectively to reduce the areas of the summits S of the elevations E.

In order to enable the operator to more eaily and more accurately follow the progress of the re-etching step, it has been found useful to incorporate a red or other contrastingly-colored dye with the second or soft resist. The contrast of the red-colored second resist layer R with the whitish-colored metal of the plate P enables the operator to terminate the re-etching at precisely the desired point. The dye used is a standard red dye which is soluble in the alcohol used as the solvent for the shellac of the second resist R. It has also been found useful and preferable to incorporate a contrastingly-colored pigment with the filler powder F for the same purpose, namely to give a contrast at the boundary between the plate metal and the filler powder. A standard yellow pigment has been successfully employed for this purpose.

In particular, the modification of the plate is accomplished selectively by removing the filler powder F from the depressions D of the plate P where shadows occur in the view, whereupon the second or soft resist R is applied to these portions so that no etching will be accomplished there. Frequently, however, it is found that the middle tones require brightening by subsequent modifications of the color plates. For example, if the view contains a green dress which exhibits too much of a bluish tone, the blue color plate is re-etched according to the invention in order to remove metal from the side walls of the depressions D and consequently to reduce the areas of the summits S of the dots or elevations representing the blue tones. If, on the other hand, the view contains a blue sky which exhibits too much of a yellowish tone, the yellow color plate is re-etched to remove the excess yellow tones by reducing the areas of the summits S of the dots or elevations E of the yellow color plate.

I claim:

1. A method of precisely and selectively reducing the first-resist-coated areas of the summits of the elevations adjacent the etched depressions in a preliminarily-etched photo-engraved printing plate for altering the tones of the prints produced therefrom, said method comprising:

filling the etched depressions of the plate with a dry pulverulent filler material, suctionally withdrawing predetermined portions of said filler material from selected depressions in the plate areas intended to remain unchanged, depositing a second etching-resist coating over the etched surface of said plate on top of the filler powder in the powder-filled depressions and also in the powder-free depressions, re-etching the thus-modified preliminarily-etched surface of the plate to reduce the summit areas of the elevations adjacent the powder-filled depressions in said plate, and removing the first and second resist coatings from the plate.

References Cited

UNITED STATES PATENTS

| | | | |
|---|---|---|---|
| 1,243,431 | 10/1917 | Leitner | 156—14 |
| 932,738 | 8/1909 | Wilson | 134—21 |
| 1,592,265 | 7/1926 | Gunterman | 156—11 |

OTHER REFERENCES

Sears Catalogue, 1959, p. 1092, Vanguard tank vacuum cleaner.

JACOB H. STEINBERG, Primary Examiner

U.S. Cl. X.R.

156—345